2,784,236

CATALYTIC HYDRATION OF ACETYLENIC DERIVATIVES

Marshall L. Spector, Stamford, George L. M. Christopher, New Canaan, and Erwin L. Carpenter, Stamford, Conn., assignors to American Cyanamid Company, New York, N. Y., a corporation of Maine No Drawing. Application July 1, 1954,
Serial No. 440,862

16 Claims. (Cl. 260—605)

This invention relates to the catalytic hydration of acetylenic derivatives to form carbonyl compounds. More particularly, it is concerned with the catalytic hydration of acetylene to produce acetaldehyde. Still more particularly the invention relates to the hydration of acetylene employing a novel catalyst composition.

A method for hydrating acetylene to acetaldehyde which is suitable for commercial development without the drawbacks of known processes has been long sought. For example, it has been long known that acetaldehyde can be produced by the hydration of acetylene in the presence of a mercuric sulfate catalyst. However, the catalyst is readily poisoned by the presence of sulfur compounds that are found in commercially available acetylene. Further, in that process, excessively large amounts of mercury had to be employed to produce acetaldehyde and there was an ever constant danger of mercury poisoning from the handling of the catalyst.

Another illustrative known method is to react acetylene with methanol in the presence of alkali alkoxides to form methylvinyl ether and then to hydrolyze the thus-formed methylvinyl ether to acetaldehyde and methanol. This procedure has not proved comercially attractive, since it is expensive to use an organic solvent and thereafter remove the organic solvent from the desired product. To the present, there has not been any wholly satisfactory method for hydrating acetylene and its homologues in an aqueous environment.

It is a principal object of the present invention to overcome the difficulties of the prior art. It is a further object to catalytically hydrate acetylene in an aqueous medium. It is a still further object to catalytically hydrate an acetylenic compound of varying grades of purity in an economical fashion without loss of catalyst activity due to catalyst poisoning.

In its broadest aspect, the process of our invention contemplates the catalytic hydration of acetylenic derivatives in the presence of an inorganic sulfide or thiocyanate which is added to or suspended in an aqueous catalyst to obtain a carbonyl derivative in good yield. An alkyne is reacted at a temperature of above 60° C. in the presence of an aqueous catalyst composition. That composition contains cuprous chloride and ammonium chloride. An inorganic sulfide or thiocyanate is then added to or suspended in the latter. It is surprising indeed that in the present invention the presence of the sulfur compound therein does not poison the aqueous hydration catalyst to any objectionable extent. Accordingly, a particular feature of the present invention is that commercial acetylene may be used. Sulfur-bearing impurities present in the commercial acetylene also will not contaminate the catalyst composition.

In general, any alkyne containing from 2 to 5 carbon atoms may be used. Exemplary of these compounds are: propyne, 1-butyne, 1-pentyne and monovinylacetylene. The present invention, however, will be described with particular reference to the hydration of acetylene which is taken as typical of the above class.

A suitable aqueous hydration catalyst composition comprises a mixture of cuprous chloride, ammonium chloride, and an inorganic sulfide or inorganic thiocyanate. Advantageously, a strong mineral acid, such as sulfuric acid or hydrochloric acid, may be added to the mixture to obtain increased yields of carbonyl compounds, although such addition is not entirely essential. Sulphur compounds that may be added to or suspended in the aqueous catalyst mixture which are entirely satisfactory for the practice of the present process are: hydrogen sulfide, alkali and alkaline earth metal sulfides, such as sodium, potassium and calcium sulfide as well as cuprous sulfide. One may also use inorganic thiocyanates, such as sodium and cuprous thiocyanates. In practice, any inorganic thiocyanate or sulfide which can be added to or suspended in a cuprous chloride-ammonium chloride aqueous medium may be used.

Each of the several ingredients that comprise the aqueous catalyst composition may vary in content over a rather broad range. Usually, a range from about 3 to 10 molar cuprous chloride is employed, and preferably 6 to 8 molar cuprous chloride is used for the best mode of operation. With respect to ammonium chloride, a range from about 5 to 12 molar may be used. However, 6 to 8 molar ammonium chloride was found to be advantageous for best results. With respect to strong mineral acid, as for example, hydrogen chloride, up to 1 molar may be used, but 0.2 molar is preferred. The inorganic sulfide or thiocyanate which is added to or suspended in the composition may range from about 0.01 to 1.0 mole per liter of solution, or higher. In order to prevent the inorganic sulfic or thiocyanate from settling out of solution, any preferred method may be employed. In one such method for the preparation of acetaldehyde, acetylene is used as a dispersing medium which keeps the inorganic sulfide or thiocyanate adequately dispersed in solution as the acetylene bubbles through it. Another method is to employ an inert support for the inorganic sulfide or thiocyanate catalyst, such as charcoal, clay or pumice.

The temperature employed to carry out the hydration reaction is generally from about 60° C. to about the boiling point of the solution. At a temperature much below 60° C., the catalyst tends to solidify; further, if the temperature drops below about 60° C., the reaction rate becomes too slow to be practical. At temperatures above 110° C. the water vapor pressure of the aqueous catalyst increases to the extent that the operation of the catalyst becomes impractical. However, if so desired, the temperature may be increased by increasing the pressure on the system.

According to the present invention, an alkyne is reacted in an aqueous menstruum which contains the above-mentioned catalyst composition. If the alkyne is a gas, it is bubbled through the aqueous menstruum in a suitable reactor. The alkyne may be added to the aqueous catalyst composition, if it is a liquid. Off-gases which emanate from the reaction vessel are then collected and separated by any means known to the art. Where acetylene is used as the alkyne, the off-gases comprise acetaldehyde and acetylene. One convenient method for separating aldehyde from acetylene is by a counter-current scrubbing method in which the off-gases are passed through water. The acetaldehyde is soluble in the water but the acetylene gas passes through the solution and is returned to the reactor. Pure acetaldehyde is then recovered from the aqueous solution by known distillation methods.

The invention will be further illustrated by the following examples, without limiting it thereto.

*Example 1*

A catalyst solution consisting of cuprous chloride and ammonium chloride in water was made up in such a manner that at 90° C., the catalyst contact was 6.6 molar with respect to both chlorides.

One liter of this contact was placed in a cylindrical glass reactor fitted with a gas inlet tube extending to the bottom of the reactor and an exit near the top of the reactor. Acetylene and hydrogen sulfide were fed through the contact maintained at 90° C. at the rates of 7 mols per hour and 0.2 mol per hour respectively. Under these conditions, the space time yield of acetaldehyde was found to be 16.2 grams per liter contact per hour.

Where hydrogen sulfide is eliminated from the contact in the above reaction, the yield of acetaldehyde was drastically reduced and was found to be about 2.5 grams per liter contact per hour.

*Example 2*

This example demonstrates the effectiveness of an acidified catalyst with and without the presence of cuprous sulfide.

A cuprous chloride-ammonium chloride solution was made up in water such that at 90° C. the concentration of the two salts were each 7.7 molar. To this solution, 0.24 mol of hydrochloric acid was then added.

One liter of contact maintained at 90° C. was placed in a cylindrical glass reactor identical with that described in Example 1 above. Acetylene was bubbled through the contact at the rate of 7 mols per hour. The yield of acetaldehyde was found to be 4.5 grams per liter contact per hour.

In a second run, to one liter of the above-described catalyst composition was added 0.12 mol of cuprous sulfide. The added cuprous sulfide did not dissolve but was suspended throughout the contact by the stirring effect of the entering gas stream. The yield of acetaldehyde was found to be 22 grams per liter contact per hour.

Additional runs were made replacing the cuprous sulfide from the previous run with hydrogen sulfide, sodium sulfide, potassium sulfide, sodium thiocyanate and cuprous thiocyanate, respectively. The yield of acetaldehyde was substantially the same as in the case of the cuprous sulfide addition.

*Example 3*

This example shows the addition of cuprous sulfide to an unacidified catalyst contact composition.

To 1 liter of aqueous catalyst consisting of 7.7 mols of ammonium chloride and 7.7 mols of cuprous chloride was suspended 0.24 mol of cuprous sulfide. When acetylene was bubbled thorugh the aqueous contact under the same conditions following the procedure of Example 1 above, the yield of acetaldehyde was found to be 4.5 grams per liter contact per hour.

*Example 4*

This example further demonstrates the effectiveness of an acidified contact and cuprous sulfide.

To 1 liter of the contact consisting of 7.7 mols of cuprous chloride and 7.7 mols of ammonium chloride was suspended 0.27 mol of cuprous sulfide and the contact acidified by the addition of 1 mol of hydrochloric acid.

When this contact was operated under the conditions described in Example 1 above, the yield of acetaldehyde was found to be 21 grams per liter contact per hour.

We claim:

1. A process for the preparation of an aldehydic compound which comprises the steps of: catalytically hydrating an alkyne containing from 2 to 5 carbon atoms at a temperature above about 60° C. in the presence of a catalyst comprising in aqueous admixture (a) from 3 to 10 molar cuprous chloride, (b) from 5 to 12 molar ammonium chloride and (c) from 0.01 to 1.0 mol of a sulfur-containing compound per liter of solution, said compound being selected from the group consisting of inorganic sulfides and inorganic thiocyanates, to form the corresponding aldehydic compond; and recovering the latter aldehydic compound.

2. A process according to claim 1 in which the inorganic sulfide is cuprous sulfide.

3. A process according to claim 1 in which the inorganic sulfide is sodium sulfide.

4. A process according to claim 1 in which the inorganic sulfide is hydrogen sulfide.

5. A process according to claim 1 in which the inorganic sulfide is potassium sulfide.

6. A process according to claim 1 in which the inorganic thiocyanate is sodium thiocyanate.

7. A process for the preparation of an aldehydic compound which comprise the steps of: catalytically hydrating an alkyne containing from 2 to 5 carbon atoms at a temperature between about 60° C. and 110° C. in the presence of a catalyst comprising in aqueous admixture (a) up to 1 molar hydrochloric acid, (b) from 3 to 10 molar cuprous chloride, (c) from 5 to 12 molar ammonium chloride and (d) from 0.01 to 1 mol of cuprous sulfide per liter of solution, to form the corresponding aldehydic compound; and recovering the latter aldehydic compound.

8. In a process for the preparation of acetaldehyde from acetylene which includes the steps of: bubbling acetylene gas through an aqueous menstruum comprising (a) water, (b) from 3 to 10 molar cuprous chloride and (c) from 5 to 12 molar ammonium chloride at a temperature from between about 60° C. and about 110° C. and recovering acetaldehyde, the improvement which comprises the step of: suspending from 0.01 to 1.0 mol of a sulfur-containing compound per liter of solution, said compound being selected from the group consisting of an inorganic sulfide and an inorganic thiocyanate in said aqueous menstruum.

9. A process according to claim 8 in which the inorganic sulfide is cuprous sulfide.

10. A process according to claim 8 wherein the inorganic thiocyanate is cuprous thiocyanate.

11. In a process for the preparation of acetaldehyde from acetylene which includes the steps of: bubbling acetylene gas through an aqueous menstruum comprising (a) water, (b) up to 1 molar hydrochloric acid, (c) from 3 to 10 molar cuprous chloride and (d) from 5 to 12 molar ammonium chloride at a temperature between about 60° C. and the boiling point of said aqueous menstruum and recovering acetaldehyde, the improvement which includes the step of: suspending from 0.01 to 1.0 mol of a sulfur-containing compound per liter of solution, said compound being selected from the group consisting of an inorganic sulfide and an inorganic thiocyanate in an aqueous menstruum.

12. A process according to claim 11 in which the inorganic sulfide is cuprous sulfide.

13. A process according to claim 11 in which the inorganic thiocyanate is cuprous thiocyanate.

14. An aqueous catalyst composition useful in the preparation of aldehydic compounds comprising in aqueous admixture (a) from 3 to 10 molar cuprous chloride, (b) from 5 to 12 molar ammonium chloride, and (c) from 0.01 to 1.0 mol of a sulfur-containing compound per liter of solution, said compound being selected from the group consisting of inorganic sulfides and inorganic thiocyanates.

15. An aqueous catalyst composition according to claim 14 wherein the inorganic sulfide is cuprous sulfide.

16. An aqueous catalyst composition useful in the preparation of acetaldehyde from acetylene comprising in aqueous admixture (a) from 3 to 10 molar cuprous chloride, (b) from 5 to 12 molar ammonium chloride, (c) up to 1 molar hydrochloric acid, and (d) from 0.01 to 1 mol of cuprous sulfide per liter of solution.

References Cited in the file of this patent

UNITED STATES PATENTS

| | | |
|---|---|---|
| 1,926,575 | Zobel et al. | Sept. 12, 1933 |
| 2,200,057 | Carter et al. | May 7, 1940 |
| 2,385,469 | Salley | Sept. 25, 1945 |
| 2,486,659 | Kurtz | Nov. 1, 1949 |
| 2,536,841 | Dornte et al. | Jan. 2, 1951 |
| 2,649,472 | Lovett | Aug. 18, 1953 |